United States Patent [19]

Okada et al.

[11] 4,040,443

[45] Aug. 9, 1977

[54] SLEEVE VALVE

[75] Inventors: Yoshitsugu Okada; Teruaki Nanao; Toshio Sugino, all of Hirakata, Japan

[73] Assignee: Kubota, Ltd., Osaka, Japan

[21] Appl. No.: 658,116

[22] Filed: Feb. 13, 1976

[30] Foreign Application Priority Data

May 27, 1975 Japan .................... 50-71896

[51] Int. Cl.² ............................................. F16K 11/07
[52] U.S. Cl. .................................. 137/546; 137/599; 137/625.38
[58] Field of Search ............... 137/599.1, 625.38, 546, 137/544, 599

[56] References Cited

U.S. PATENT DOCUMENTS

| 332,855 | 12/1885 | Worthen | 137/625.38 |
| 559,560 | 5/1896 | Wright | 137/546 X |
| 1,684,475 | 9/1928 | Collier et al. | 137/546 |
| 2,584,083 | 1/1952 | Mellett | 137/546 X |
| 3,776,278 | 12/1973 | Allen | 137/625.38 |

*Primary Examiner*—Arnold Rosenthal
*Attorney, Agent, or Firm*—Armstrong, Nikaido & Marmelstein

[57] ABSTRACT

A sleeve valve comprises a cylindrical valve body formed with a multiplicity of discharge ports in the peripheral wall and having an upper end secured to the upper wall of a reducing chamber, and a valve cylinder gate having open upper and lower ends and slidably fitted in the valve body, the gate communicating at its upper end with an inlet elbow for pressurized water. A drain tube extending through the bottom cover of the valve body and the bottom wall of the reducing chamber connects the lower end of the sleeve valve to the bottom wall to prevent the vibration of the valve.

4 Claims, 3 Drawing Figures

SLEEVE VALVE

BACKGROUND OF THE INVENTION

Sleeve valves used for water chambers or water tanks serving as pressure reducing chambers are usually connected to a high-pressure water inlet elbow secured to the upper wall of the chamber. Such sleeve valves comprise a valve cylinder gate having open ends and fitted in the end of the inlet elbow vertically slidably in intimate contact with the inner surface of the elbow, and a cylindrical valve body fitted around the lower portion of the valve cylinder gate and secured to the upper wall of the chamber, the valve body having a number of discharge ports in its peripheral wall and a bottom cover closing its lower end, so as to regulate the flow of water to be discharged from the inlet elbow by controlling the open area between the bottom cover and the lower end of the gate.

Although the valve body of the sleeve valve is fixed at its upper end to the upper wall of the chamber, the lower end of the valve body is liable to move because it is unsupported and merely extends downward within the reducing chamber. Thus the valve involves the problem that the water vigorously flowing out from between the lower end of the gate and the valve seat vibrates the valve body and, accordingly, the whole valve.

Since the sleeve valve has a closed structure in which the upper end of the valve body is adapted to be attached to the upper wall of a tank or chamber, foreign matter or solids in water tend to accumulate on the bottom cover, thus entailing the necessity of periodically cleaning the interior of the valve body. However, when the water chamber or tank equipped with a sleeve valve is built underground and used as embedded in the earth as is often practiced, the cleaning operation requires very great labor for excavation and disassembly of the valve.

SUMMARY OF THE INVENTION

An object of this invention is to provide a sleeve valve including a drain tube connecting the center of a bottom cover of a valve body to the bottom wall of a tank to maintain a water compartment in the valve body in communication with the outside of the tank, the upper portion of the valve body being secured to the upper wall of the tank, the lower portion of the valve body being secured to the bottom wall of the tank by the drain tube, whereby the sleeve valve is strengthened when mounted in position thereby to prevent the vibration of the valve body and to render the interior of the valve body very easy to clean.

DETAILED DESCRIPTION OF THE INVENTION

Figure 1:
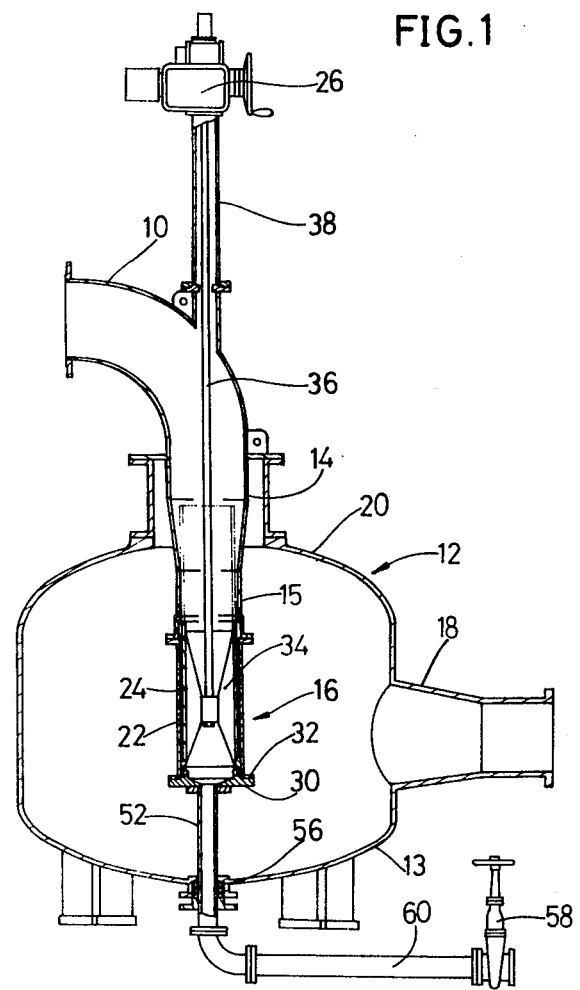
FIG. 1 is a front view partly broken away and showing a sleeve valve according to this invention.

FIG. 1 shows a first embodiment of this invention. An inlet elbow 10 has an end connected to a reducer 14 on the upper wall of a pressure reducing chamber formed by a closed tank 12 and is in communication with a sleeve valve 16 disposed within the tank 12.

The water whose pressure has been reduced by the sleeve valve 16 flows into the reducing chamber and is run off through an outlet tube 18 connected to the peripheral wall of the tank 12. Generally, the lower portion of the inlet elbow 10 and the reducing tank 12 are positioned underground.

The sleeve valve 16 comprises a cylindrical valve body 22 secured at its upper end to the upper wall 20 of the tank, a valve cylinder gate 24 fitted in the valve body 22 and movable upward and downward, and an electric motor operator 26 for driving the valve cylinder gate 24 upward and downward. The valve body 22 is formed in its peripheral wall with a multiplicity of discharge ports 28 which are tapered radially outward and through which the interior of the valve body 22 communicates with outside. The lower end of the valve body 22 is supported by a bottom cover 30 and a lower flange 32 of the body is fixed on it. The bottom of the valve body 22 is closed by the cover.

The valve cylinder gate 24 has at its lower end an enlarged portion 25 in intimate contact with the inner surface of the valve body 22. The gate has an upper portion in contact with a straight tubular portion 15 of the reducer 14 and is movable to its raised positioned indicated in the dot-and-dash line.

The valve cylinder gate 24 is provided therein with a bracket 34 which secures the lower end of a valve stem 36 to the gate. The valve stem 36 extends upward through the wall of the inlet elbow 10, is slidable in intimate contact with the wall and is engaged by the electric motor operator 26 mounted on a stand 38. The operator 26 drives the stem to raise the gate 24 to the desired level relative to the valve body 22, whereby a number of discharge ports 28 in proportion to the upward displacement of the gate 24 are brought into communication with the water compartment in the gate 24 for the discharge of water. Thus the flow of water can be controlled by raising or lowering the valve cylinder gate 24.

Figure 3:
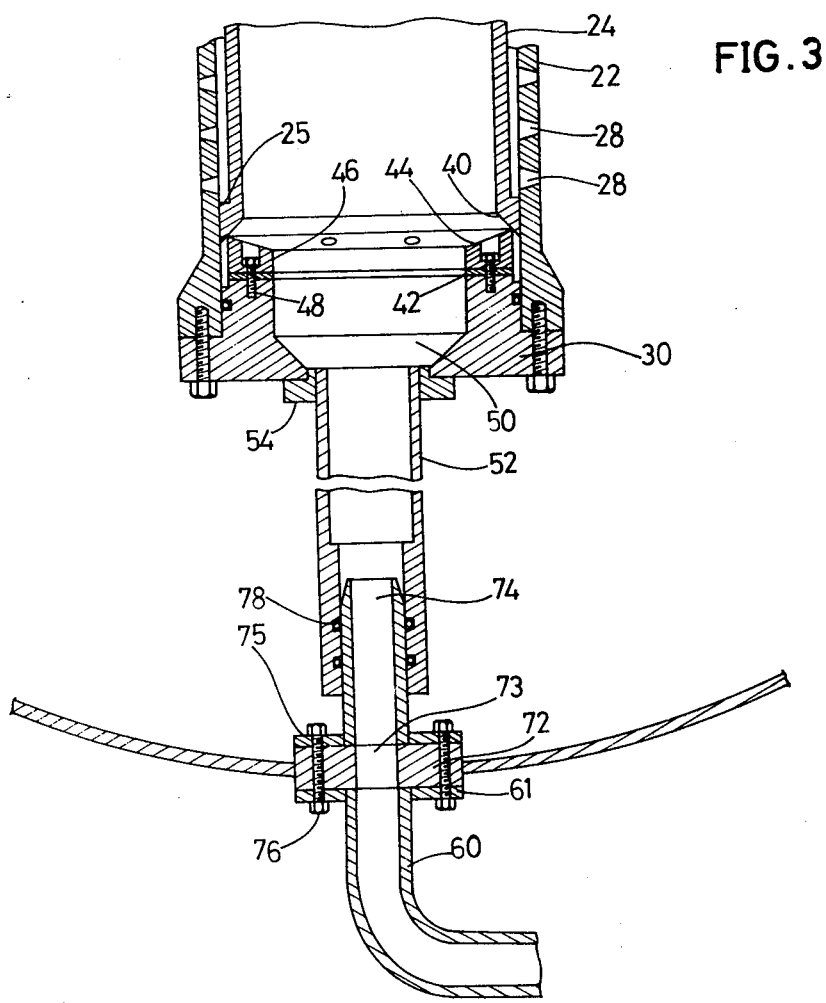
FIG. 3 is a view in section of still another embodiment of the sleeve valve of this invention in which a drain tube and a valve seat are shown on an enlarged scale.

As shown in FIG. 3, the lower extremity of the valve cylinder gate 24 has an abutting surface 40 outwardly downwardly inclined from inside. The bottom cover 30 is provided thereon with an elastic gasket 42, on which there is positioned an annular valve seat 46 made of abrasion-resistant metal and having an inwardly downwardly inclined upper surface 44. The valve seat 46 is secured to the bottom cover 30 by bolts 48. Accordingly, when the gate 24 descends to the lower end of the valve body 22, bringing the abutting surface 40 of the gate 24 into contact with the edge of the valve seat 46, line-to-line contact takes place, so that even if the valve seat surface 44 has deposits or accumulations thereon, the water chamber within the gate 24 can be completely sealed to effectively block the flow of water. Furthermore, the elastic gasket 42 underlying the valve seat 46 permits the gate 24 to exert uniform pressure on the valve seat 46 by virtue of the compression and deformation of the gasket and therefore protects the valve seat 46.

The bottom cover 30 of the valve body 22 is formed with a downwardly tapered center bore 50. A drain tube 52 has an upper end flange 54 connected to the bottom cover 30 and communicates with the bore. The lower end of the drain tube 52 extends through, and is secured by a seal 56 to, the bottom wall 13 of the tank 12. The extremity of the drain tube 52 projecting outward from the tank 12 is coupled to a discharge pipe 60 equipped with a valve 58. Since the deposits on the inclined valve seat surface 44 of the valve seat 46 move over the seat surface 44 onto the bottom cover 30, the valve 58 on the discharge pipe 60 will be opened for the purpose of cleaning, allowing water to flow through the pipe 60, whereby the deposits are readily removable from the bottom cover 30. Moreover, the drain tube 52, connecting the valve body 22 to the bottom wall 13 of the tank, gives the valve body increased resistance to sidewise shakes, with the result that the vibration of the sleeve valve 16 can be greatly reduced even when the water flows out vigorously from the discharge ports 28 of the valve body 22 during operation.

Figure 2:
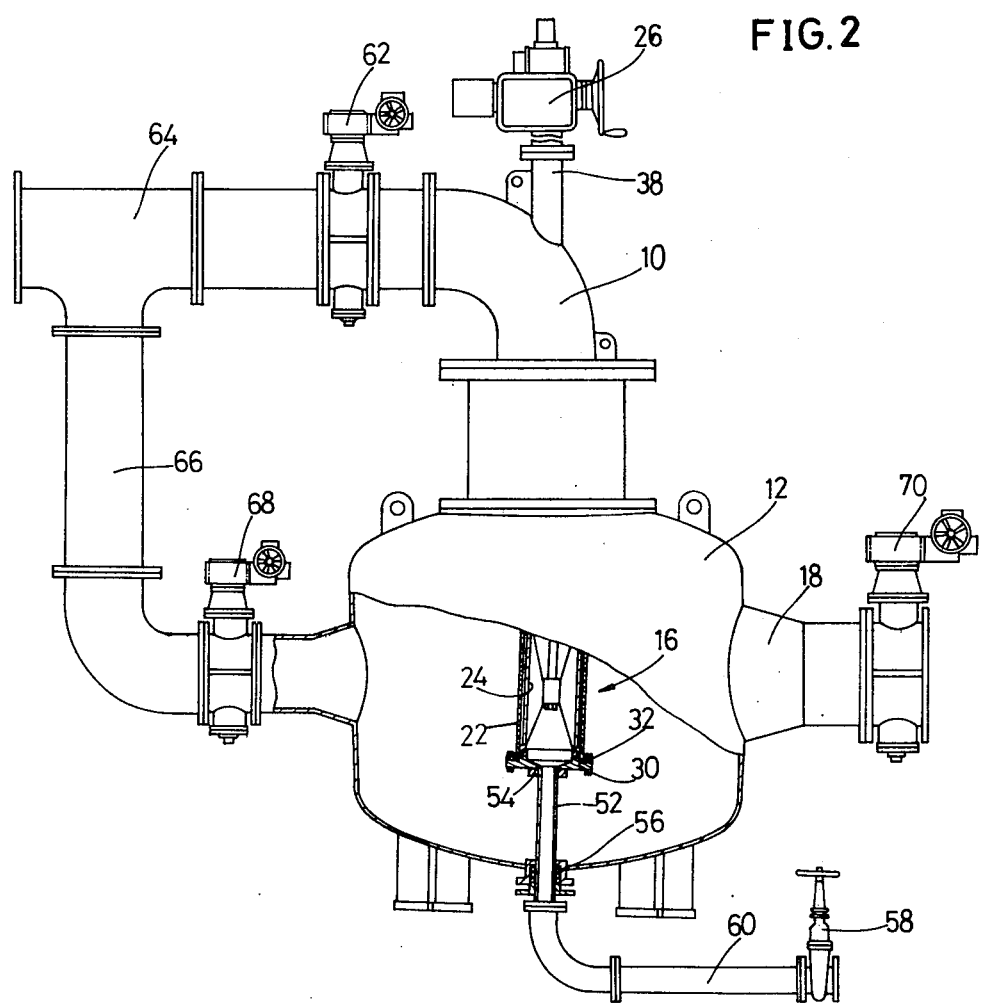
FIG. 2 is a front view showing another embodiment of the sleeve valve of this invention.

FIG. 2 shows a second embodiment of this invention in which a tee 64 is provided upstream of the inlet elbow 10, with a valve 62 disposed therebetween. A branch pipe 66 to be used for cleaning extends from the tee 64 and is provided with a valve 68. The pipe 66 is joined to the side wall of the reducing chamber. In addition, the outlet tube 18 is equipped with a valve 70. Thus the reducing chamber is rendered closable. During usual operation, the valves 58 and 68 on discharge pipe 60 and the branch pipe 66 are closed, while the valves 62 and 70 on the inlet line and outlet tube 18 are open, permitting the pressurized water to flow out of the chamber as in the embodiment of FIG. 1. For cleaning, all the valves 58, 62, 68 and 70 are switched over to the opposite positions to the above, allowing the water to flow from the branch pipe 66 into the reducing chamber, then through the discharge ports 28 and into the valve body 22, from which the water is drawn off through the drain tube 52 and the discharge pipe 60. The reverse flow of pressurized water readily cleans the valve 16 by removing all deposits from the tapered discharge ports 28 of the valve body 22 and accumulations from the bottom cover 30.

FIG. 3 shows a third embodiment of this invention in which the bottom wall 13 of the tank 12 is provided with a reinforcing plate 72 centrally bored as at 73. A flange 61 at the end of the discharge pipe 60 is joined to the outer side of the plate 72. Joined to the inner side of the reinforcing plate 72 is a flange 75 at the lower end of a straight tube 74 having a tapered upper end. Bolts 76 extend through the two flanges 61, 75 and the reinforcing plate 72 and fasten them together, with the straight tube 74 in alignment with the upper end of the discharge pipe 60. The lower portion of the drain tube 52 fits around the straight tube 74, with o rings 78 provided therebetween. The drain tube 52 is slidable on the straight tube 74 in intimate contact therewith. As in the first and second embodiments, therefore, the drain tube 52 supports the lower end of the sleeve valve 16 against lateral shakes and serves to discharge the accumulations on the bottom cover 30 therethrough during cleaning operation.

For the repair, maintenance and inspection of the sleeve valve 16, the upper end of the tank 12 is opened, and the sleeve 16 is withdrawn upward, whereby the drain tube 52 is detached from the straight tube 74. Whereas it has heretofore been necessary for the operator to enter the tank 12 and to dismount the sleeve valve 16 from the tank 12 after excavating the whole tank 12 from the earth, the embodiment of this invention does not require such troublesome procedure.

Although the sleeve valve is mounted on a pressure reducing tank in each of the foregoing embodiments, the sleeve valve of this invention, like known sleeve valves, is of course similarly mountable on the upper wall of a pressure reducing water chamber.

This invention is not limited to the embodiments described above and illustrated in the drawings. It is to be understood that other changes and modifications may be made by those skilled in the art without departing from the scope of this invention.

What is claimed is:

1. A sleeve valve for connection to a reducing chamber comprising a valve body having a peripheral wall formed with a multiplicity of discharge ports extending therethrough, a lower end closed by a bottom cover attached thereto and an upper end secured to an upper wall of the reducing chamber, a valve cylinder gate having open upper and lower ends and slidably fitted in the valve body in contact with the inner surface of the body, the valve cylinder gate being coupled to means operable from outside for upwardly or downwardly driving the gate to control the number of the discharge ports in communication with a water compartment within the gate and to thereby regulate the flow of water, and a drain tube means secured at its upper end to the bottom cover of the valve body and having a lower end extending through a bottom wall of the reducing chamber and communicating with the outside of the chamber.

2. A sleeve valve as defined in claim 1 wherein the drain tube means comprises a first tube in communication with the outside of the chamber secured to the bottom wall of the chamber, and a second tube secured at its upper end to the bottom cover of the valve body being detachably fitted to the straight tube and communicating with the outside of the chamber through the straight tube.

3. A sleeve valve as defined in claim 1 wherein an upstream side of an inlet elbow connected to the valve communicates with the reducing chamber through a branch pipe to pass water from the upstream side directly into the reducing chamber, and each of the inlet elbow, the branch pipe, the drain tube and an outlet portion of the reducing chamber is provided with a valve respectively to change over the direction of flow of water.

4. A sleeve valve as defined in claim 1 wherein the drain tube means comprises a single tube having its upper end secured to the bottom cover of the valve body and having its lower end extending through the bottom wall of the reducing chamber.

* * * * *